(12) United States Patent
Hsu et al.

(10) Patent No.: US 7,881,276 B2
(45) Date of Patent: Feb. 1, 2011

(54) SYSTEM AND METHOD FOR RELAYING DATA

(75) Inventors: Yu-Ching Hsu, Hsinchu County (TW); Jen-Shun Yang, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 1053 days.

(21) Appl. No.: 11/461,140

(22) Filed: Jul. 31, 2006

(65) Prior Publication Data

US 2008/0025280 A1 Jan. 31, 2008

(51) Int. Cl.
*H04Q 7/28* (2006.01)
(52) U.S. Cl. ............... 370/341; 370/432; 455/11.1; 455/13.1
(58) Field of Classification Search ............ 370/341, 370/329, 395.3–4, 431, 432; 455/450, 464, 455/509, 11.1, 13.1
See application file for complete search history.

(56) References Cited

U.S. PATENT DOCUMENTS

| | | | |
|---|---|---|---|
| 2004/0063451 A1* | 4/2004 | Bonta et al. ............... 455/519 |
| 2004/0224631 A1* | 11/2004 | Davis et al. ............... 455/11.1 |
| 2005/0047364 A1* | 3/2005 | Matsukura et al. ......... 370/328 |
| 2005/0055720 A1 | 3/2005 | Atad et al. |
| 2005/0197748 A1 | 9/2005 | Hoist et al. |
| 2006/0009240 A1 | 1/2006 | Katz |
| 2007/0072604 A1* | 3/2007 | Wang ....................... 455/428 |
| 2007/0184777 A1* | 8/2007 | Tanoue ..................... 455/11.1 |
| 2007/0201392 A1* | 8/2007 | Ramachandran ............ 370/315 |
| 2008/0002608 A1* | 1/2008 | Zheng et al. ............... 370/328 |
| 2008/0002631 A1* | 1/2008 | Ramachandran ............ 370/338 |
| 2009/0213775 A1* | 8/2009 | Rey et al. ................... 370/312 |

OTHER PUBLICATIONS

Ralf Pabst, et al. "Relay-Based Deployment Concepts for Wireless and Mobile Broadband Radio", Wireless World Research Forum, IEEE Communications Magazine, pp. 80-89 (Sep. 2004).
Jing Nie, et al., "Communication with Bandwidth, Optimization in IEEE 802.16 and IEEE 802.11 Hybrid Networks", Proceedings of ISCT 2005, pp. 26-29 (Jul. 2005).
Norbert Esseling, et al., Performance Evaluation of a Fixed Relay Concept for Next Generation Wireless Systems, IEEE, pp. 744-751 (2004).

* cited by examiner

*Primary Examiner*—CongVan Tran
(74) *Attorney, Agent, or Firm*—Alston & Bird LLP (57) ABSTRACT

A data communication system includes a mobile station capable of receiving data communications directed to the mobile station, at least one relay station capable of relaying data between a base station and the mobile station, and the base station capable of assigning a connection identifier to the mobile station and each of the at least one relay station and sending a protocol data unit through the at least one relay station to the mobile station, the protocol data unit being capable of identifying the connection identifier assigned to the mobile station without identifying the connection identifier assigned to the at least one relay station.

24 Claims, 11 Drawing Sheets

RLY-REQ:

| (8-bit) | (4-bit) | (16-bit) | (8-bit) | (32-bit~32x255-bit) | (8-bit) | (32-bit~32x255-bit) |
|---|---|---|---|---|---|---|
| Message Type (M1) | Action Type | MSCID/ MSID | Length 1 | (I-RCID, O-RCID) List/ (I-RMSID, O-RMSID) List | Length 2 | Uplink MSCID List |

FIG. 4A

RLY-RSP:

| (8-bit) | (4-bit) | (16-bit) |
|---|---|---|
| Message Type (M2) | Action Type | MSCID/ MSID |

FIG. 4B

DOWNLINK:

| MS's CID | Input RCID | Output RCID |
|---|---|---|
| MSCID n1 | RCID p1 | RCID p2 |
| MSCID n2 | RCID q2 | RCID q2 |

FIG. 4C

UPLINK:

| MS's CID | SMSID | Input RMSID | Output RMSID |
|---|---|---|---|
| MSCID n1 | MSID o1 | RMSID p1 | RMSID p2 |
| MSCID n2 | MSID o1 | RMSID p1 | RMSID p2 |
| MSCID n3 | MSID o2 | RMSID q1 | RMSID q2 |

SYSTEM AND METHOD FOR RELAYING DATA

BACKGROUND OF THE INVENTION

The present invention relates generally to systems and methods for data communications, and more particularly, to systems and methods for relaying data in a multihop relay network architecture.

The demand for quality of service ("QoS") in wireless networking systems has been addressed by the IEEE (Institute of Electrical and Electronics Engineers) 802.16 standard. The IEEE 802.16 standard adopts a polling-based media access control ("MAC"), which is more deterministic than the contention-based MAC used by the 802.11 standard. The 802.16's MAC layer enables classification of QoS and non-QoS dependant application flows and maps them to connections with distinct scheduling services, enabling both guaranteed handling and traffic enforcement. In the point-to-multipoint ("PMP") architecture specified in the IEEE 802.16 standard, data are directly transmitted between a base station (BS) and a mobile station (MS). However, to improve throughput and amplify the service range of a BS, the Mobile Multihop Relay ("MMR") Task Group has revised the IEEE 802.16 standard such that an MS is able to communicate in both uplink and downlink connections with a BS through a relay station ("RS"). Imagine that a BS sends data to or receives data from plural MS's through plural RS's, which is sure to happen in the MMR network architecture. An issue may arise regarding how to transmit data in a simple and efficient manner. Another issue may arise as to how a BS maps data with one MS of a plurality of MS's.

Figure 1:
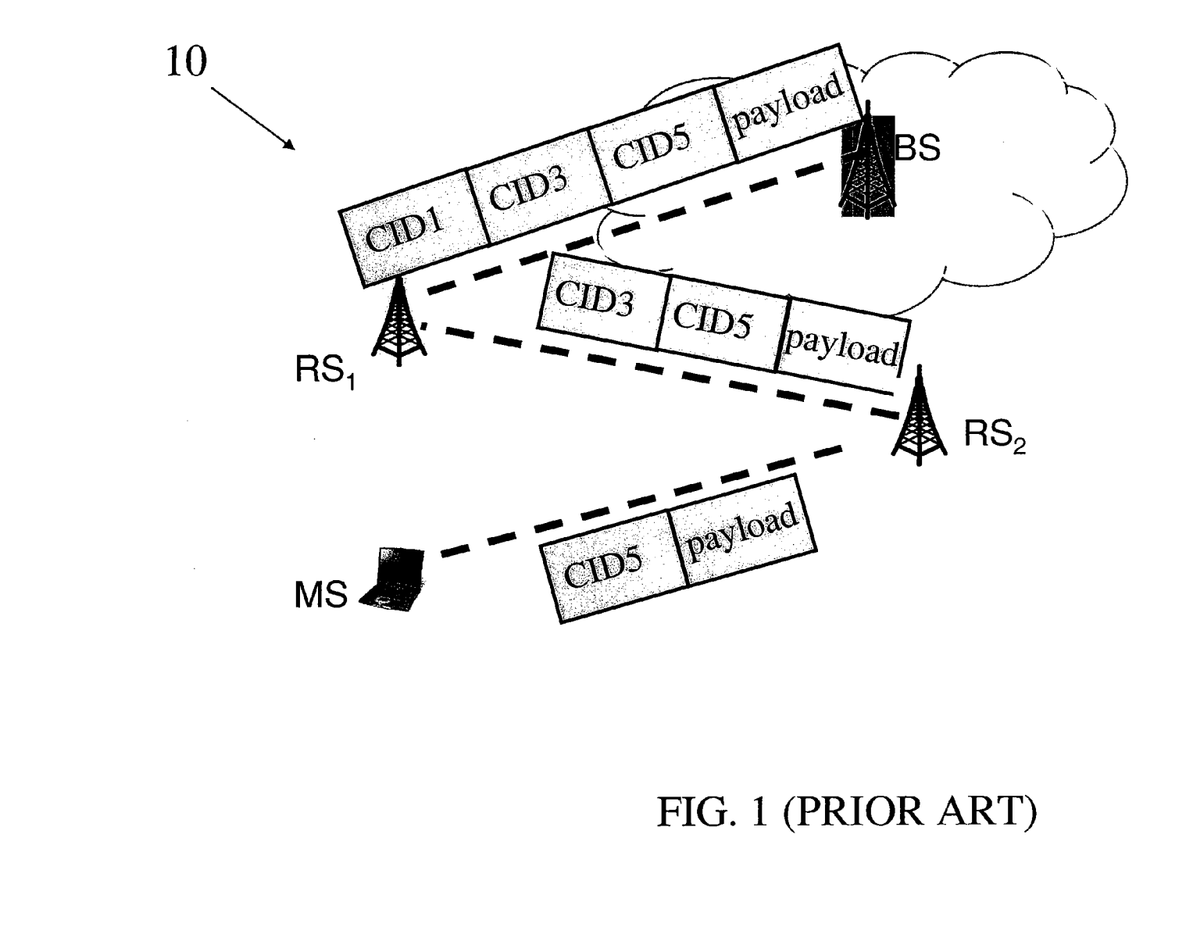
FIG. 1 is a schematic diagram of a system using a conventional tunneling approach in a mobile multihop relay ("MMR") network.

FIG. 1 is a schematic diagram a system 10 using a conventional tunneling approach in an MMR network. Referring to FIG. 1, the system 10 includes a base station labeled BS, a first relay station labeled $RS_1$, a second relay station labeled $RS_2$ and a mobile station labeled MS. The BS assigns connection identifiers ("CID"s) CID1, CID3 and CID5 to the $RS_1$, $RS_2$ and MS, respectively, and allocates time intervals $t_1$, $t_2$ and $t_3$ for the connections CID1, CID3 and CID5, respectively. In a downlink transmission, a payload is to be transmitted from the BS to the MS through the $RS_1$ and $RS_2$. In operation, during the time interval $t_1$ corresponding to CID1, the BS sends a first protocol data unit ("PDU") including the payload prefixed with CID1, CID3 and CID5 as headers for control the transfer of the payload. Meanwhile, $RS_1$ receives the first PDU sent from the BS. $RS_1$ then prepares a second PDU by removing the header CID1 from the first PDU. During the time interval $t_2$ corresponding to CID3, $RS_1$ sends the second PDU including the payload prefixed with CID3 and CID5 as headers to $RS_2$. Similarly, $RS_2$ then prepares a third PDU by removing the header CID3 from the second PDU sent from $RS_1$. During the time $t_3$ corresponding to CID5, $RS_2$ sends the third PDU including the payload prefixed with CID5 as header to the MS. The above-described tunneling approach may be simple in operation but requires more headers as the transmission path is longer, which adversely affects the throughput. Moreover, adding the headers at the BS before transmission and removing the headers at the relay stations during transmission may further deteriorate the throughput. Consequently, the tunneling approach may not be a desired method for data relay in the MMR network architecture. It is desirable to have a system and a method that is able to transmit data in a simple and efficient manner, and ensure correct transmission between a BS and an MS through at least one RS.

BRIEF SUMMARY OF THE INVENTION

Examples of the invention may provide a system and a method for relaying data in a mobile multihop relay ("MMR") network architecture.

Examples of the invention may provide a data communication system that comprises a mobile station capable of receiving data communications directed to the mobile station, at least one relay station capable of relaying data between a base station and the mobile station, and the base station capable of assigning a connection identifier to the mobile station and each of the at least one relay station and sending a protocol data unit through the at least one relay station to the mobile station, the protocol data unit being capable of identifying the connection identifier assigned to the mobile station without identifying the connection identifier assigned to the at least one relay station.

Examples of the invention may also provide a data communication system that comprises a mobile station capable of receiving data communications directed to the mobile station, at least one relay station capable of relaying data between a base station and the mobile station, and the base station capable of assigning at least one connection identifier to the mobile station and allocating a time interval to the mobile station and each of the at least one relay station, wherein the mobile station sends at least one protocol data unit towards the base station during the time interval allocated to the mobile station, each of the at least one protocol data unit being capable of identifying one of the at least one connection identifier assigned to the mobile station without identifying a connection identifier assigned to the at least one relay station.

Some examples of the invention may also provide a system for relaying data in a multihop relay network that comprises at least one relay station capable of relaying a protocol data unit (PDU) in a downlink transmission towards a mobile station, the PDU including a header composed of a connection identifier (CID) assigned to the mobile station, and relaying at least one PDU in an uplink transmission towards a base station, each of the at least one PDU including a header composed of one of at least one CID assigned to the mobile station.

Examples of the invention may also provide a data communication method that comprises establishing a communication channel, assigning a connection identifier to a mobile station capable of receiving data communications directed to the mobile station through the communication channel, and providing a protocol data unit capable of identifying only the connection identifier assigned to the mobile station, and sending the protocol data unit through at least one relay station to the mobile station.

Examples of the invention may also provide a method for relaying data in a multihop relay network that comprises assigning at least one connection identifier to a mobile station capable of receiving data communications directed to the mobile station, allocating a time interval to the mobile station and each of at least one relay station, preparing at least one protocol data unit each capable of identifying one of the at least one connection identifier assigned to the mobile station without identifying a connection identifier assigned to the at least one relay station, and sending the at least one protocol data unit towards the base station during the time interval allocated to the mobile station.

Examples of the invention may also provide a method for relaying data in a multihop relay network that comprises providing at least one relay station, relaying a protocol data unit in a downlink transmission towards a mobile station, the protocol data unit including a header composed of a connection identifier assigned to the mobile station, and relaying at least one protocol data unit in an uplink transmission towards a base station, each of the at least one protocol data unit including a header composed of one of at least one connection identifier assigned to the mobile station.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples consistent with the invention. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like portions.

Figure 2A:
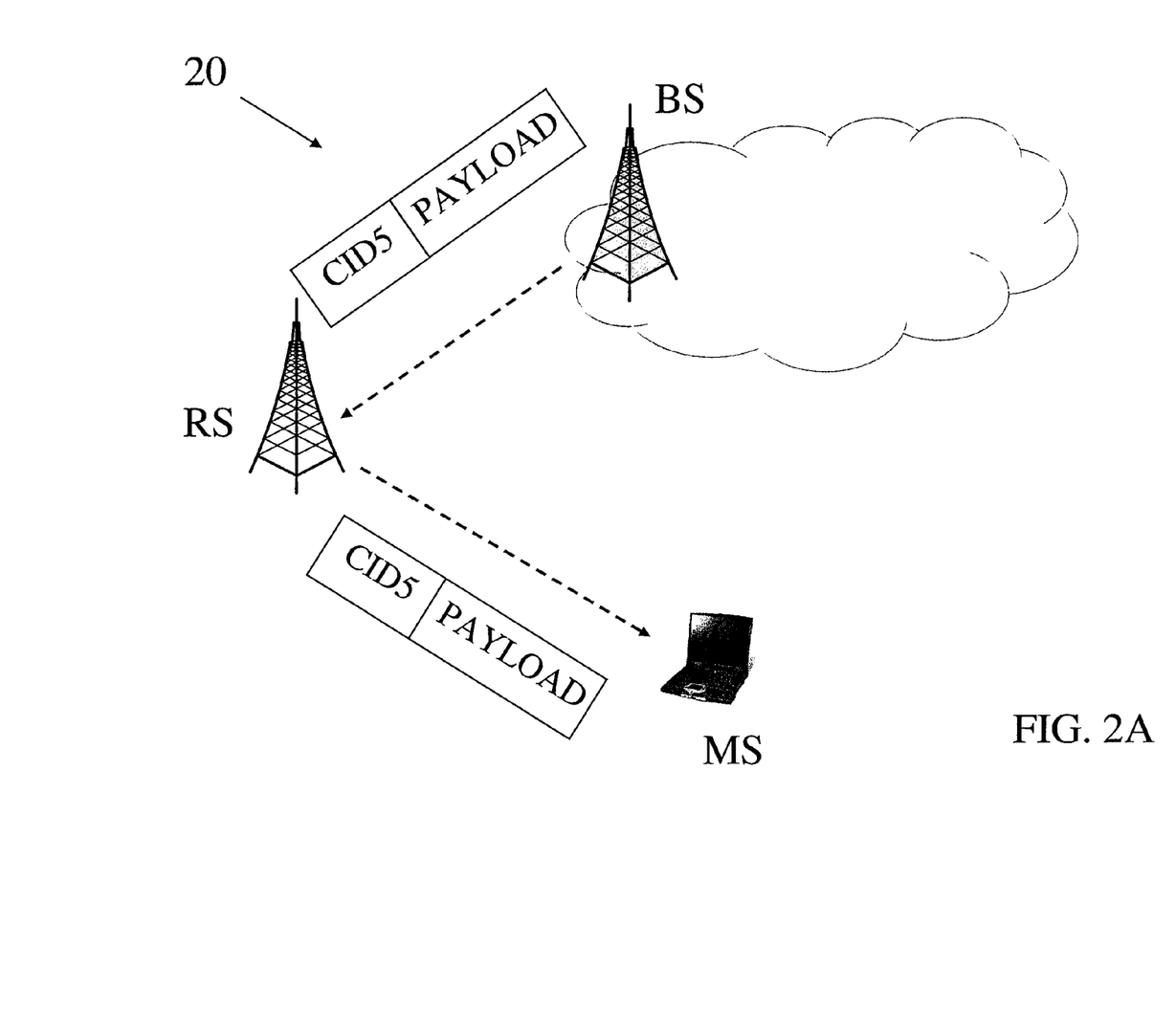
FIG. 2A is a schematic diagram of a system capable of relaying data in an MMR network consistent with an example of the present invention.

FIG. 2A is a schematic diagram of a system 20 capable of relaying data in an MMR network consistent with an example of the present invention. Referring to FIG. 2A, the system 20 includes a base station labeled BS, a relay station labeled RS and a mobile station labeled MS. The BS includes but is not limited to a central hub or concentrator, which is connected to a wide area network ("WAN") access point. The BS manages transmission scheduling and assigns connection identifiers ("CIDs") to at least one such RS and MS in the system 20. An RS or MS assigned with a specific CID will receive a message broadcast from the BS at a specific time corresponding to the specific CID. A CID represents, for example, a file transfer protocol ("FTP") connection for exchanging files over a communication network. The RS includes but is not limited to a repeater or any other devices capable of relaying data communications. The MS refers to a subscriber station, which may be connected to a remote Ethernet network and establishes a bi-directional data link with a reachable authorized base station. Examples of the MS include a cell phone, a personal digital assistant ("PDA") and a notebook.

Figure 2B:
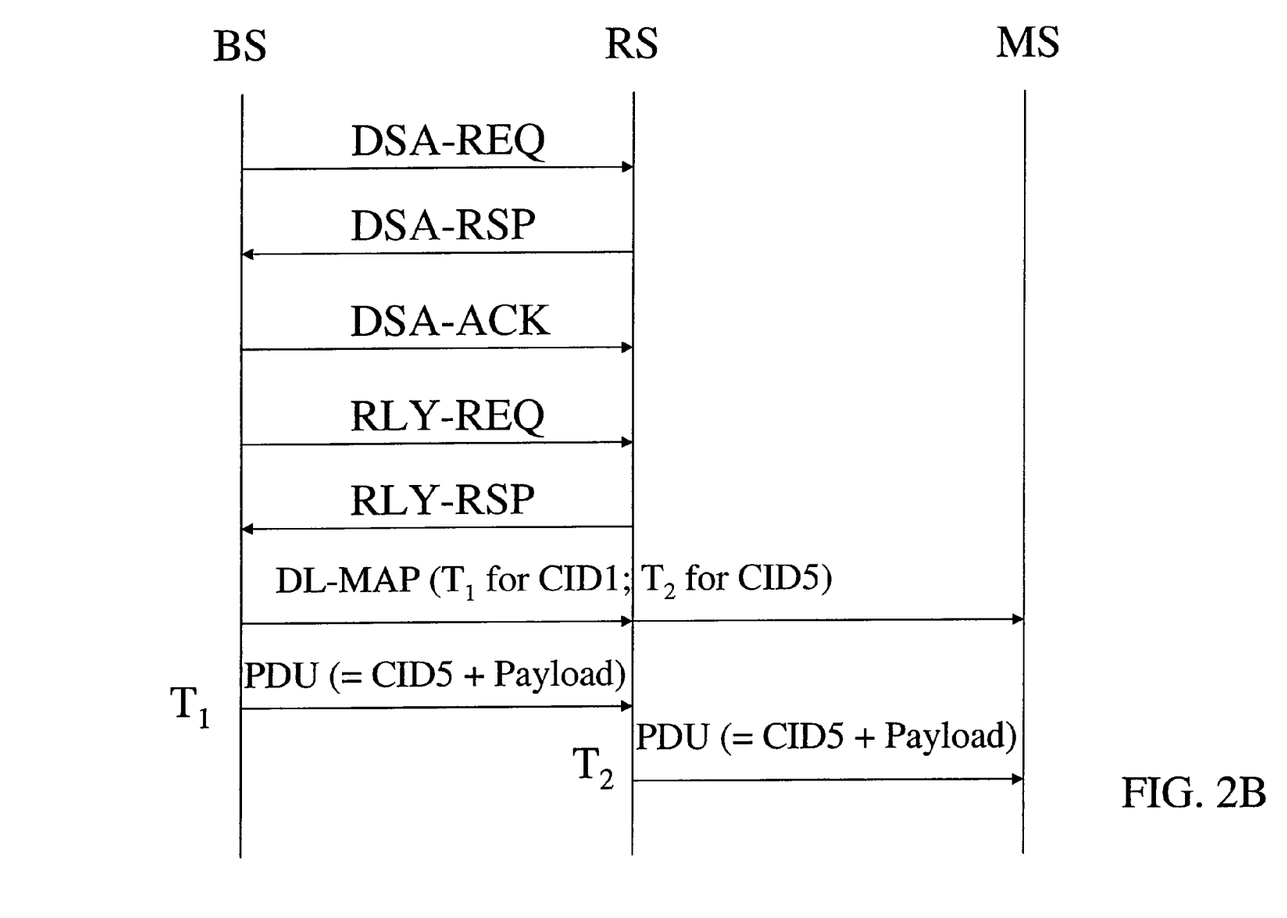
FIG. 2B is a chart illustrating a method for downlink transmission in the system of FIG. 2A.

FIG. 2B is a chart illustrating a method for downlink transmission in the system 20 of FIG. 2A. Prior to transmitting a payload from the BS down to the MS, a resource announcing process is initiated by the BS to inform the RS of the resource such as the bandwidth managed by the BS. Referring to FIG. 2B, the BS sends a dynamic service addition request (DSA-REQ) message to the RS, which replies with a dynamic service addition response (DSA-RSP) message. The BS then sends a dynamic service addition acknowledge (DSA-ACK) message to the RS to complete the resource announcing process. These messages, i.e., DSA-REQ, DSA-RSP and DSA-ACK, are specified in the IEEE 802.16 standard and need not be farther discussed.

The BS also establishes connections for the RS and MS, schedules the connections and assigns CIDs to the RS and MS. In the downlink mode, each of the CIDs, as an example, may correspond to a time interval in the time division multiple access ("TDMA") system 20. In the present example, a CID1 corresponding to a time interval $T_1$ is assigned to the RS, and a CID5 corresponding to a time interval $T_2$ is assigned to the MS. A downlink map managed by the BS for the connection scheduling keeps records of the CIDs and the corresponding time intervals.

A negotiation process is then performed between the BS and RS. The BS sends a relay request (RLY-REQ) message to the RS, which replies with a relay response (RLY-RSP) message to complete the negotiation process. The messages RLY-REQ and RLY-RSP for downlink transmission are not defined in the IEEE 802.16 standard and will be discussed later. After the negotiation process, the RS recognizes that the connection interval corresponding to CID1 is used to transmit the payload with a header CID5. That is, the RS recognizes that at the beginning of the time interval $T_1$, a protocol data unit ("PDU") including the payload prefixed with CID5 as header will be sent from the BS. Skilled persons in the art will understand that a file to be sent to the MS may be divided into plural PDUs, which in turn may be sent in different time frames under the same CID. Unlike the tunneling approach illustrated with respect to FIG. 1 wherein a PDU may include plural headers, the PDU in the present example identifies only the destination CID without identifying the CID or CIDs of one or more RSs. For example, the PDU may include only the destination CID as header, i.e., CID5 that is assigned to the MS.

Next, the BS broadcast a downlink map (DL-MAP) message in the system 20, which indicates the assigned CID1 and CID5 and the time intervals $T_1$ and $T_2$ corresponding thereto, respectively. Also referring to FIG. 2A, the RS, assigned with the CID1, receives the PDU sent from the BS in response to the time interval $T_1$, and sends the same PDU to the MS in response to the time interval $T_2$. The MS, assigned with the CID5, receives the PDU sent from the RS in response to the time interval $T_2$.

Figure 3A:
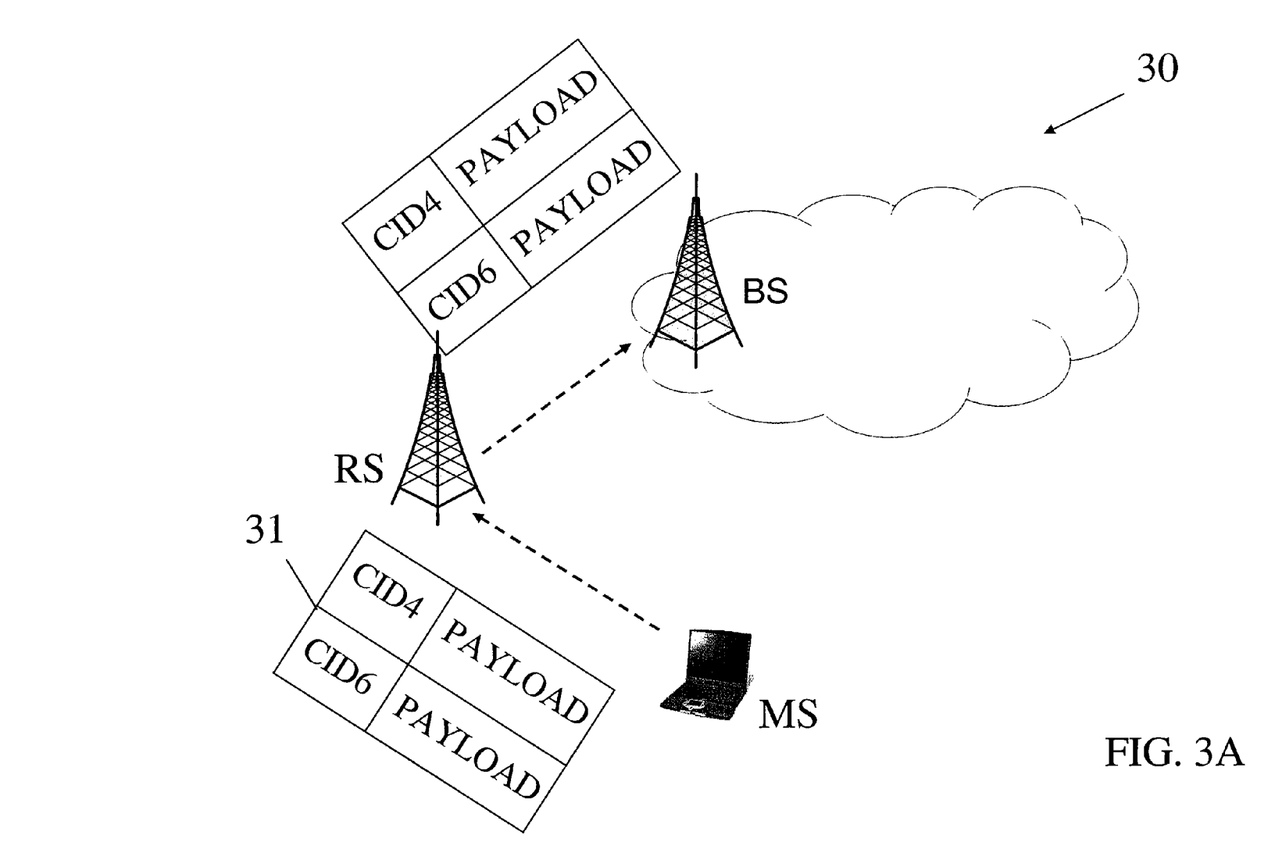
FIG. 3A is a schematic diagram of a system capable of relaying data in an MMR network consistent with another example of the present invention.

FIG. 3A is a schematic diagram of a system 30 capable of relaying data in an MMR network consistent with another example of the present invention. Referring to FIG. 3A, the system 30 is similar to the system 20 illustrated in FIG. 2A except that system 30 operates in an uplink mode. In the uplink transmission from MS to BS, a time interval corresponds to one of a plurality of mobile stations in the system 30. That is, a mobile station may send at least one PDU to the BS during a time interval scheduled for the mobile station. In the present example, assuming that CIDs 4 and 6 have been assigned to the MS, a first PDU headed by CID 4 and a second PDU headed by CID 6 are sent from the MS to the RS during a first time interval. The RS sends the first and second PDUs to the BS during a second time interval.

Figure 3B:
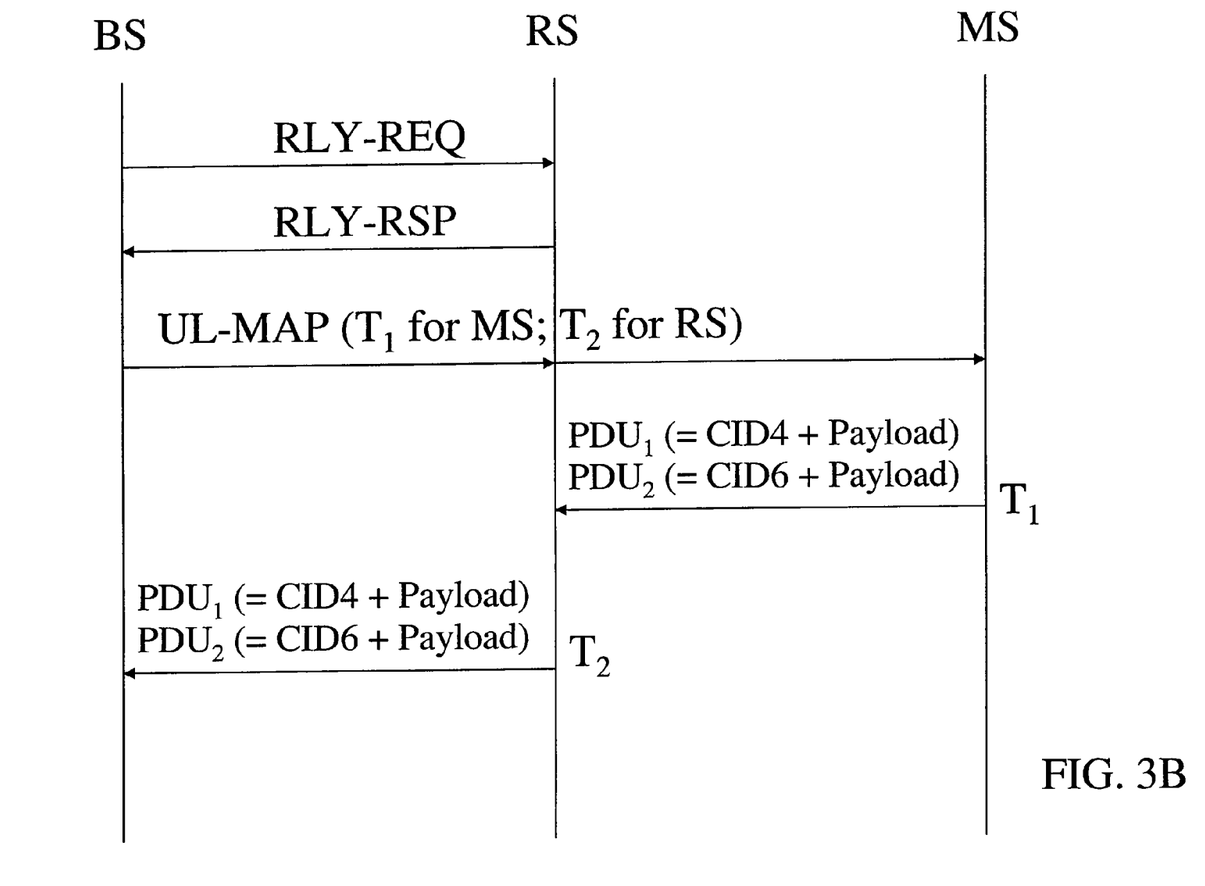
FIG. 3B is a chart illustrating a method for uplink transmission in the system of FIG. 3A.

FIG. 3B is a chart illustrating a method for uplink transmission in the system 30 of FIG. 3A. Referring to FIG. 3B, a negotiation process is performed between the BS and RS. The BS sends a relay request (RLY-REQ) message to the RS, which replies with a relay response (RLY-RSP) message to complete the negotiation process. The messages RLY-REQ and RLY-RSP for uplink transmission are not defined in the IEEE 802.16 standard and will be discussed later. After the negotiation process, the RS recognizes that the connection interval corresponding to the MS is used to transmit a first payload with a header CID4 and a second PDU with a header CID6. The RS recognizes that at the beginning of a first time interval $T_1$, the first PDU including the first payload and the CID4 header and the second PDU including the second payload and the CID6 header will be sent from the MS.

Next, the BS broadcast an uplink map (UL-MAP) message in the system 30, which indicates that the first time interval $T_1$ is allocated to the MS and the second time interval $T_2$ is allocated to the RS. Also referring to FIG. 3A, the MS sends and the RS receives the first and second PDUs in response to the time interval $T_1$. The RS then sends and the BS receives the first and second PDUs in response to the time interval $T_2$.

Figure 4A:
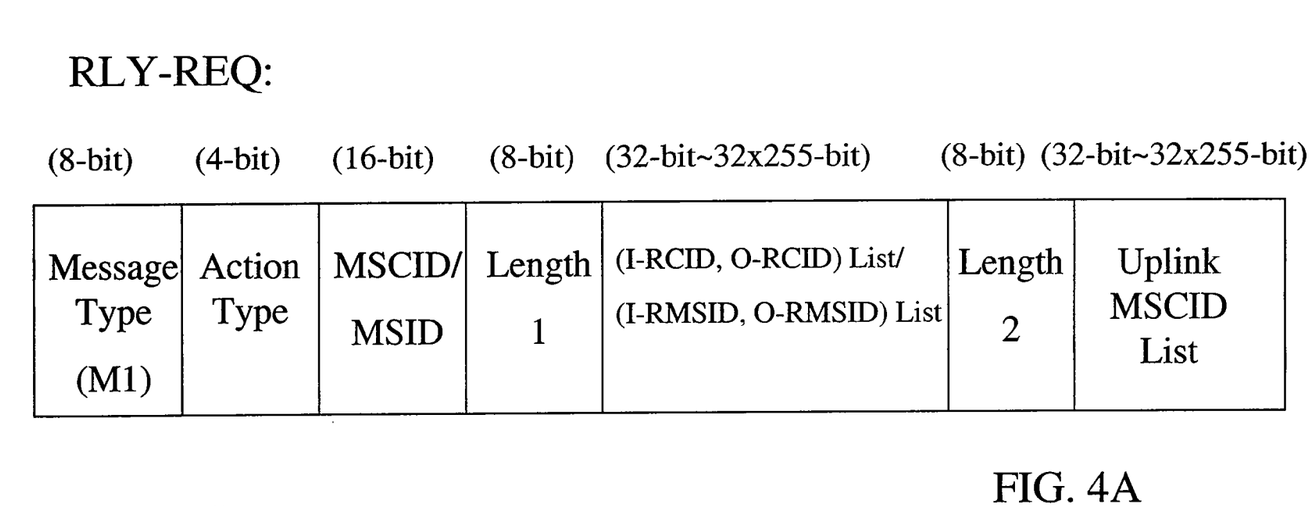
FIG. 4A is a frame format of a relay-request (RLY-REQ) message consistent with an example of the present invention.

FIG. 4A is a frame format of a relay-request (RLY-REQ) message consistent with an example of the present invention. Referring to FIG. 4A, the RLY-REQ message for downlink/uplink transmission includes an 8-bit message type, a 4-bit action type, a 16-bit MSCID/MSID, an 8-bit length 1, and an (I-RCID, O-RCID) list/(I-RMSID, O-RMSID) list. The RLY-REQ message further includes an 8-bit length 2 and an uplink MSCID list for the uplink transmission. The bit size of each of the entries of the RLY-REQ message may vary as applications vary. The message-type entry includes M1 and M2, which correspond to the RLY-REQ message and the RLY-RSP message, respectively. The action-type entry is defined as follows.

$0_{HEX}$: DL-create, creating a mapping in a downlink transmission, wherein $0_{HEX}$ refers to a hexadecimal zero (0), and the mapping refers to a relaying path between a mobile station and at least one relay station during data transmission;

$1_{HEX}$: DL-delete, deleting a mapping in a downlink transmission;

$2_{HEX}$: DL-update, updating a mapping in a downlink transmission by replacing an old (I-MSCID, O-RCID) list with a new one when, for example, a mobile station moves from one relay station to another;

$3_{HEX}$: UL-create, creating a mapping in an uplink transmission;

$4_{HEX}$: UL-delete, deleting a mapping in an uplink transmission;

$5_{HEX}$: UL-update, updating a mapping in an uplink transmission by replacing an old (I-RMSID, O-RMSID) list with a new one when, for example, a mobile station moves from one relay station to another; and $6\sim15_{HEX}$: reserve, being reserved for future use.

The MSCID entry for downlink transmission indicates a CID assigned to a mobile station by a base station. The MSID entry for uplink transmission indicates an identity (ID) number of a mobile station, which distinguishes the mobile station from any other mobile stations. The Length-1 entry indicates the number of the (I-RCID, O-RCID) list in the downlink transmission or the (I-RMSID, O-RMSID) list in the uplink transmission. The (I-RCID, O-RCID) refers to a pair of CIDs assigned to a mobile station and a relay station, or a pair of CIDs assigned to a pair of relay stations that relay in a downlink transmission, where I-RCID refers to the CID of an input relay station, which receives data during a time interval, and O-RCID refers to the CID of an output relay station, which sends the data during the time interval. The (I-RMSID, O-RMSID) refers to a pair of IDs of a pair of stations for an uplink transmission, wherein the pair of stations includes a mobile station and a relay station and a pair of relay stations. The Length-2 entry indicates the number of an uplink MSCID list, which lists the CIDs of a mobile station. The Length 2 and the uplink MSCID list are only available for an uplink transmission.

As an example of the downlink transmission illustrated with respect to FIGS. 2A and 2B, the frame format of the downlink RLY-REQ message is given below.

| M1 | 0 | CID5 | 1 | (CID1, CID5) |
|----|---|------|---|--------------|

As an example of the uplink transmission illustrated with respect to FIGS. 3A and 3B, the frame format of the uplink RLY-REQ message is given below, assuming that the IDs of the MS and RS are MS1 and RS1, respectively.

| M1 | 3 | MS1 | 1 | (MS1, RS1) | 2 | CID4, CID6 |
|----|---|-----|---|------------|---|------------|

Figure 4B:
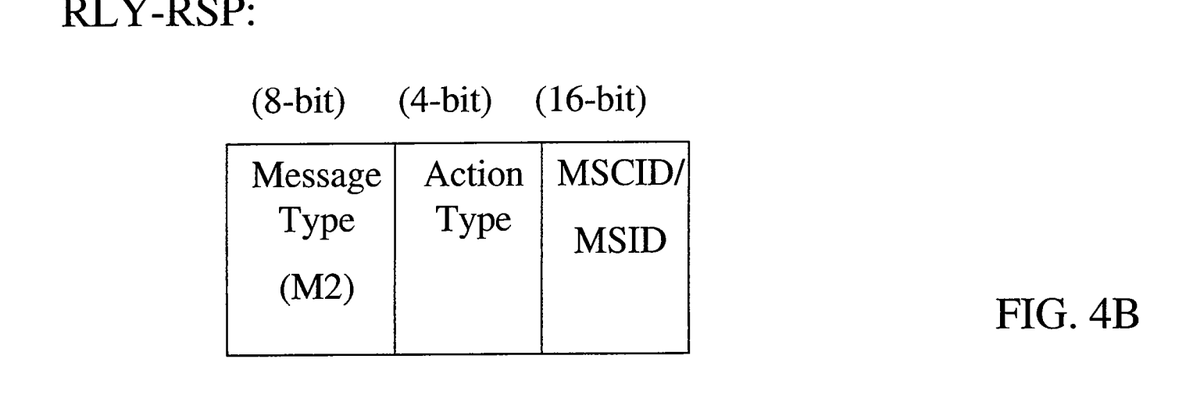
FIG. 4B is a frame format of a relay-response (RLY-RSP) message consistent with an example of the present invention.

FIG. 4B is a frame format of a relay-response (RLY-RSP) message consistent with an example of the present invention. Referring to FIG. 4B, the RLY-RSP message for downlink/uplink transmission includes an 8-bit message type, a 4-bit action type and a 16-bit MSCID/MSID. The definitions of the entries, i.e., message type, action type and MSCID/MSID, are the same as those previously discussed in relation to the RLY-REQ message. Generally, a relay station duplicates the contents of the message type, action type and MSCID/MSID included in the RLY-REQ message in preparing the RLY-RSP message. Since the action-type entry and the MSCID/MSID entry enables a base station to determine which RLY-RSP message corresponds to which RLY-REQ message, the base station is able to send one RLY-REQ message after another without any responding RLY-RSP message. As an example of the downlink transmission illustrated with respect to FIGS. 2A and 2B, the frame format of the downlink RLY-RSP message is given below.

| M2 | 0 | CID5 |
|----|---|------|

As an example of the uplink transmission illustrated with respect to FIGS. 3A and 3B, the frame format of the uplink RLY-RSP message is given below.

| M2 | 3 | MS1 |
|----|---|-----|

Figure 4C:
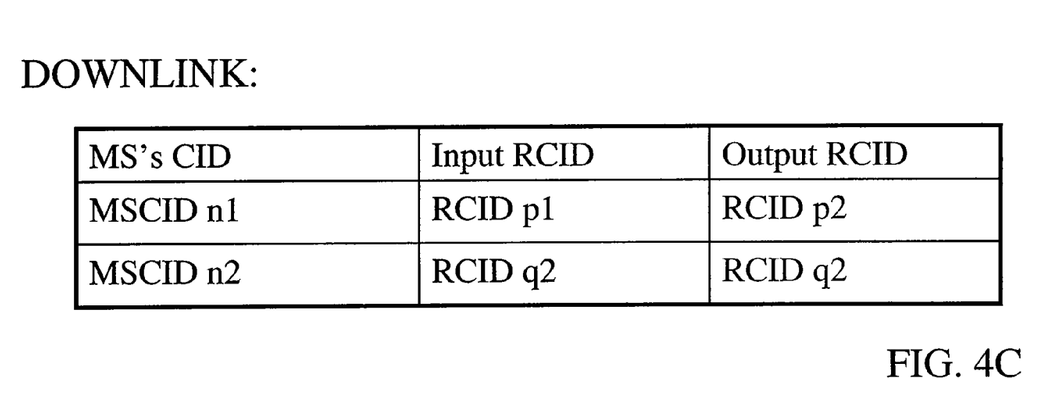
FIG. 4C is a mapping table for downlink transmission consistent with an example of the present invention.

FIG. 4C is a mapping table for downlink transmission consistent with an example of the present invention. The table stores the mapping between each of plural mobile stations and at least one of plural relay stations. Referring to FIG. 4C, in the downlink transmission a base station sends a first PDU to a first mobile station with a CID n1 through a first relay station with a CID p1 and a second relay station with a CID p2. Similarly, the base station sends a second PDU to a second mobile station with a CID n2 through a third relay station with a CID q1 and a fourth relay station with a CID q2. As an example of the downlink transmission illustrated with respect to FIGS. 2A and 2B, the mapping table in the RS is given below.

| CID5 | CID1 | CID5 |
|------|------|------|

Figure 4D:
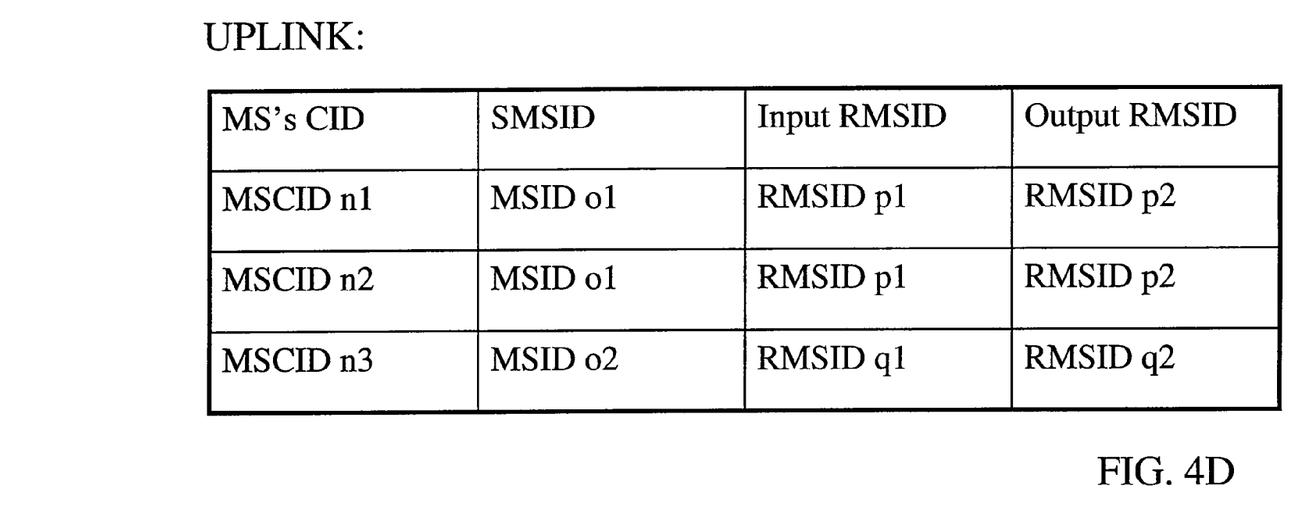
FIG. 4D is a mapping table for uplink transmission consistent with an example of the present invention.

FIG. 4D is a mapping table for uplink transmission consistent with an example of the present invention. Referring to FIG. 4D, in the uplink transmission a mobile station having an ID 01 sends a first PDU headed by a CID n1 to a base station in a time interval through a first relay station having an ID p1 and a second relay station having an ID p2. The mobile station ID01 also sends a second PDU headed by a CID n2 to the base station in the time interval through the first relay station p1 and the second relay station p2. Furthermore, a second mobile station having an ID 02 sends a third PDU headed by a CID n3 to the base station through a third relay station having an ID q1 and a fourth relay station having an ID q2.

As an example of the uplink transmission illustrated with respect to FIGS. 3A and 3B, the mapping table is given below.

| CID4 | MS1 | MS1 | RS1 |
|------|-----|-----|-----|
| CID6 | MS1 | MS1 | RS1 |

Figure 5A:
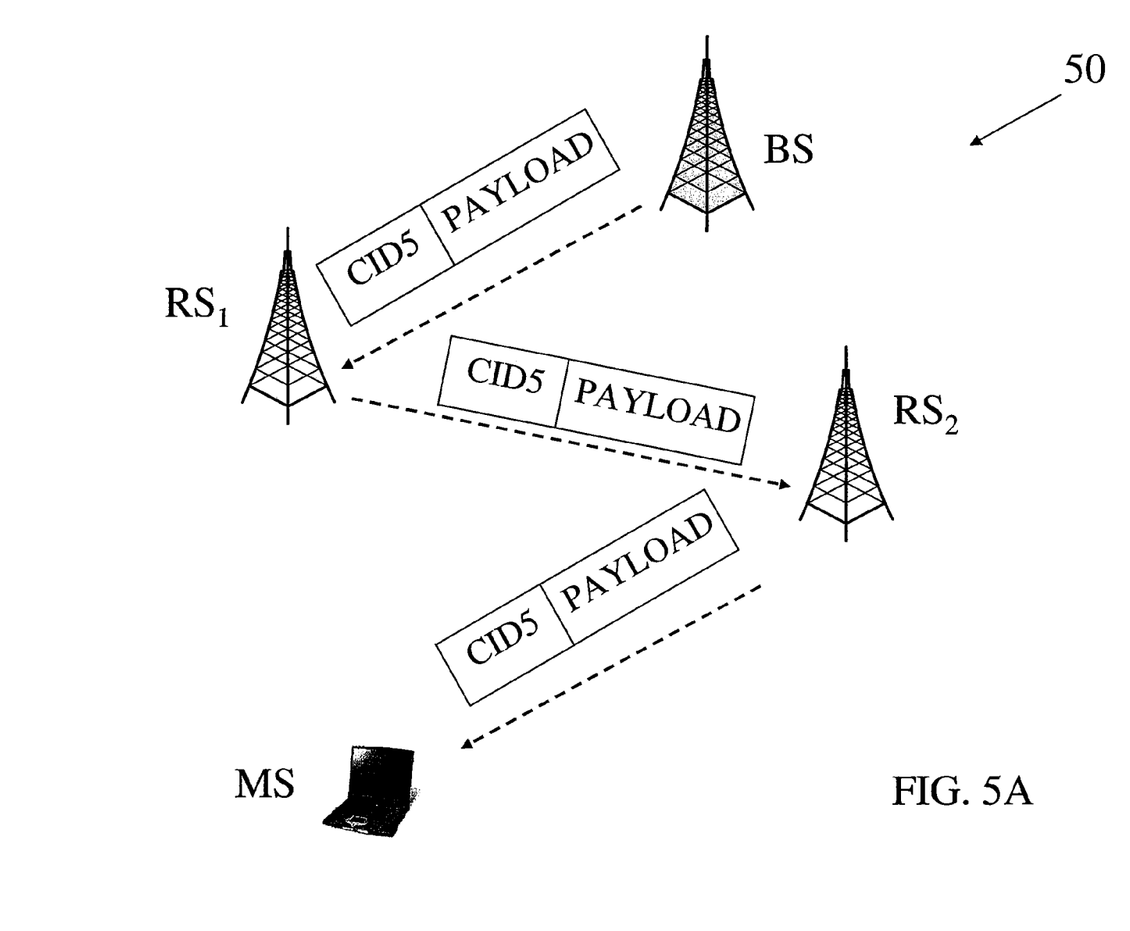
FIG. 5A is a schematic diagram of a system capable of relaying data in an MMR network consistent with still another example of the present invention.

FIG. 5A is a schematic diagram of a system 50 capable of relaying data in an MMR network consistent with still another example of the present invention. Referring to FIG. 5A, the system 50 includes a base station labeled BS, a first relay station labeled $RS_1$, a second relay station labeled $RS_2$ and a mobile station labeled MS. In the downlink transmission, having assigned a CID5 to the MS, the BS sends a PDU headed by CID5 to the $RS_1$ during a first time interval. The $RS_1$ receives the PDU in response to the first time interval and sends the PDU to the $RS_2$ during a second time interval. The $RS_2$ receives the PDU in response to the second time interval and sends the PDU to the MS during a third time interval.

Figure 5B:
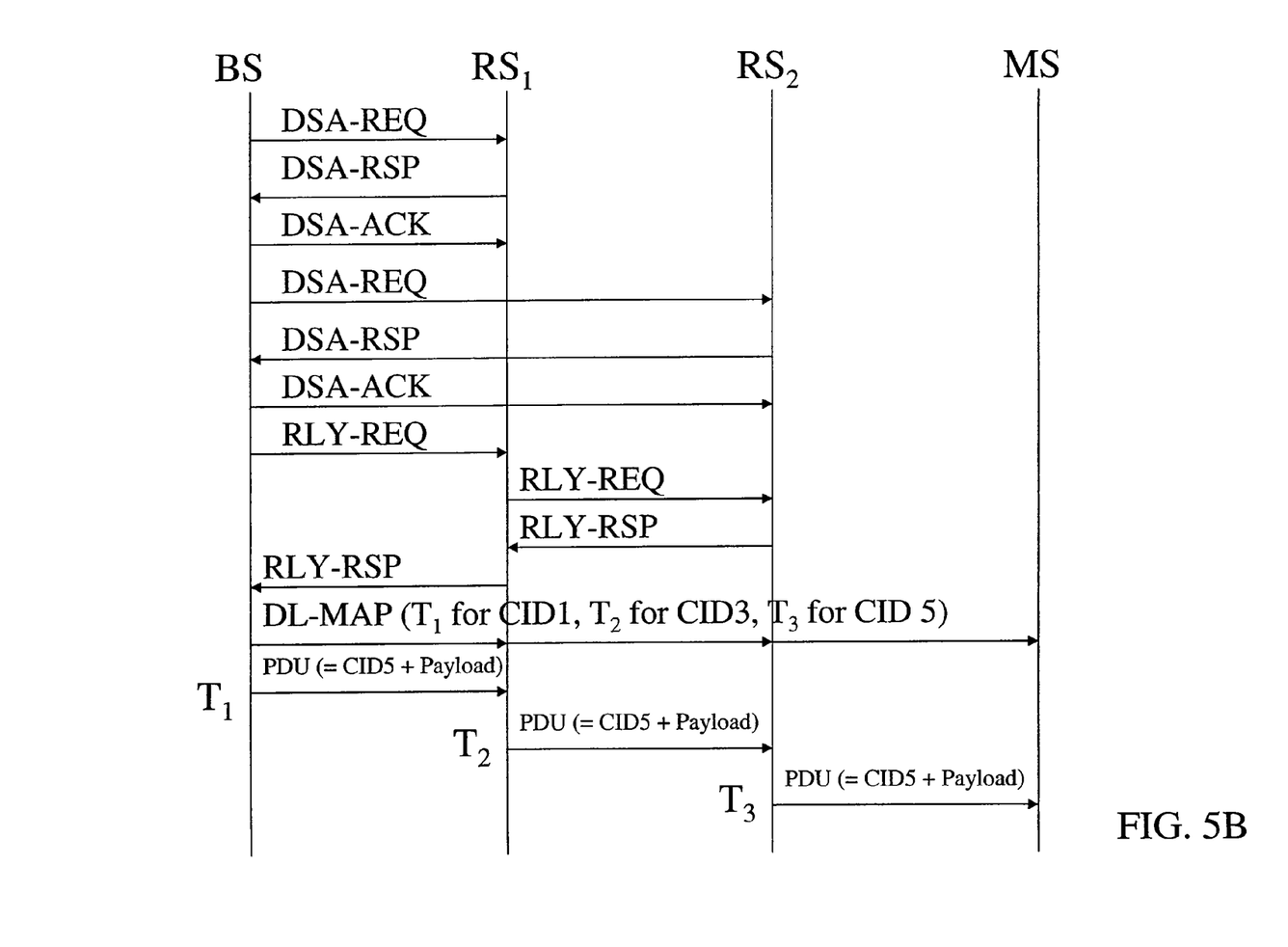
FIG. 5B is a chart illustrating a method for downlink transmission in the system of FIG. 5A.

FIG. 5B is a chart illustrating a method for downlink transmission in the system 50 of FIG. 5A. Referring to FIG. 5B, a first resource announcing process is performed between the BS and the $RS_1$, and a second resource announcing process is performed between the BS and the $RS_2$. A negotiation process is then performed as follows. The BS sends a first RLY-REQ message to the $RS_1$, indicating that the time interval allocated to the $RS_1$ is able to be used to relay the PDU with the CID5 header. In response to the first RLY-REQ message, the $RS_1$ creates a first mapping table, and prepares a second RLY-REQ message by reducing the number in the Length 1 by 1 and removing the first pair in the (I-RCID, O-RCID) list in the first RLY-REQ message. The second RLY-REQ message is then sent to the $RS_2$. In response to the second RLY-REQ message, the $RS_2$ creates a second mapping table, and prepares a RLY-RSP message. The RLY-RSP message is sent from the $RS_2$ to the $RS_1$ and then from the $RS_1$ to the BS. It is assumed that CID1, CID3 and CID5 have been assigned to the $RS_1$, $RS_2$ and MS, respectively. After the negotiation process, $RS_1$ and $RS_2$ recognize that they will relay a PDU including the CID5 as header. The BS broadcasts a downlink map (DL-MAP) message, which indicates the assigned CID1, CID3 and CID5 and the time intervals $T_1$, $T_2$ and $T_3$ corresponding thereto, respectively. Also referring to FIG. 5A, the $RS_1$, assigned with the CID1, receives the PDU sent from the BS in response to the time interval $T_1$, and sends the same PDU to the $RS_2$ in response to the time interval $T_2$. The $RS_2$, assigned with the CID3, sends the PDU to the MS in response to the time interval $T_3$.

The frame format of the RLY-REQ message for the downlink transmission is given below.

(1) the format sent from the BS to the $RS_1$:

| M1 | 0 | CID5 | 2 | (CID1, CID3); (CID3, CID5) |
|----|---|------|---|----------------------------|

(2) the format sent from the $RS_1$ to the $RS_2$:

| M1 | 0 | CID5 | 1 | (CID3, CID5) |
|----|---|------|---|--------------|

The frame format of the RLY-RSP message for the downlink transmission is given below.

(1) the format sent from the $RS_2$ to the $RS_1$:

| M2 | 0 | CID5 |
|----|---|------|

(2) the format sent from the $RS_1$ to the BS:

| M2 | 0 | CID5 |
|----|---|------|

The mapping tables in the $RS_1$ and $RS_2$ for the downlink transmission is given below.

(1) $RS_1$:

| CID5 | CID1 | CID3 |
|------|------|------|

(2) $RS_2$:

| CID5 | CID3 | CID5 |
|------|------|------|

Figure 6A:
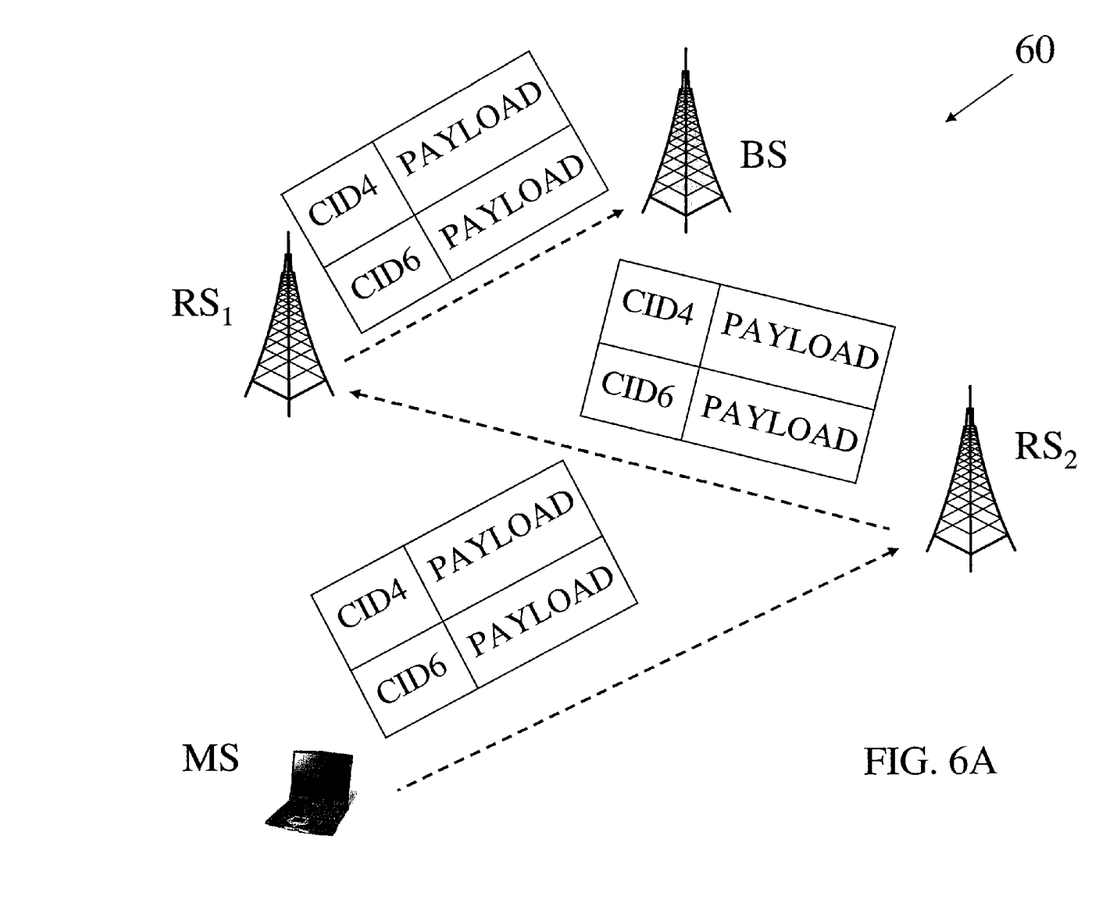
FIG. 6A is a schematic diagram of a system capable of relaying data in an MMR network consistent with yet another example of the present invention.

FIG. 6A is a schematic diagram of a system 60 capable of relaying data in an MMR network consistent with yet another example of the present invention. Referring to FIG. 6A, the system 60 is similar to the system 50 illustrated in FIG. 5A except that system 60 operates in an uplink mode. In the uplink transmission from MS to BS, a time interval is allocated to one of a plurality of mobile stations. A mobile station is allowed to send at least one PDU to the BS during the time interval allocated. In the present example, assuming that CIDs 4 and 6 have been assigned to the MS, a first PDU headed by CID 4 and a second PDU headed by CID 6 are sent from the MS to the $RS_2$ during a first time interval. The $RS_2$ sends the first and second PDUs to the $RS_1$ during a second time interval. The $RS_1$ sends the first and second PDUs to the BS during a third time interval.

Figure 6B:
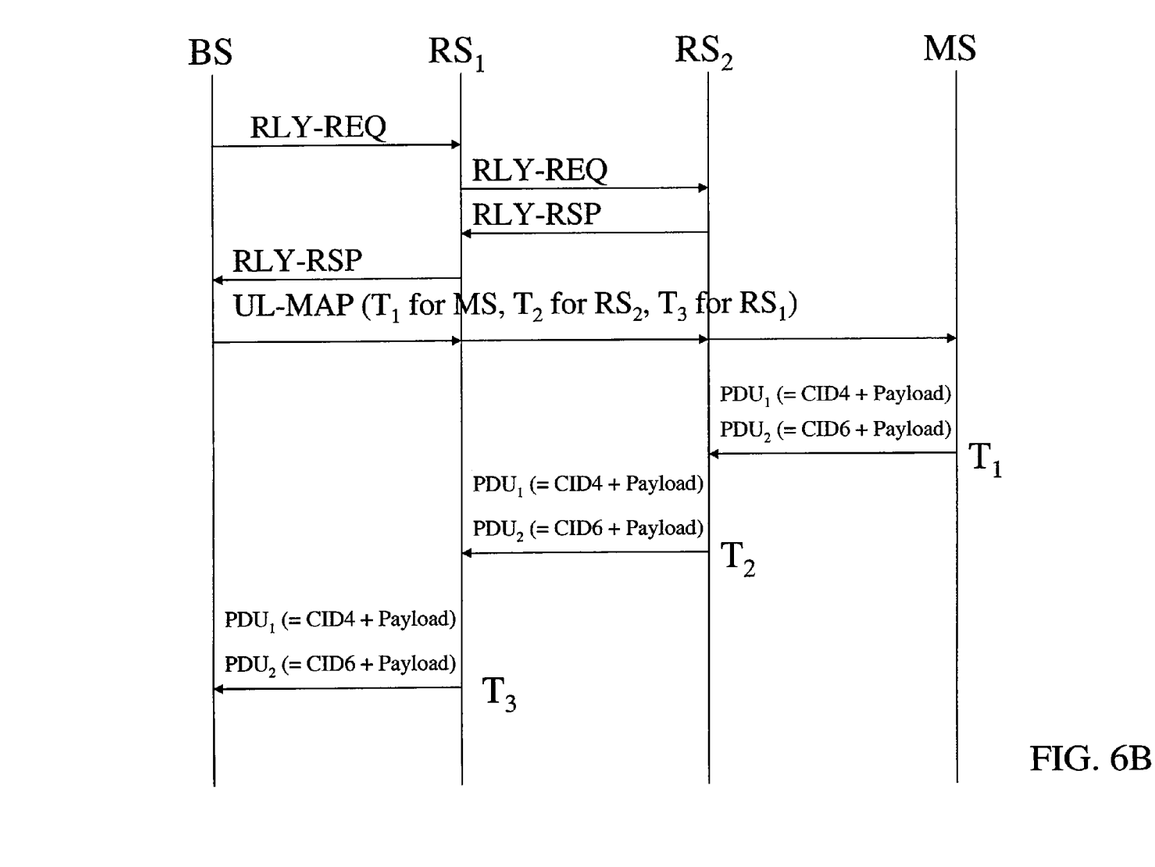
FIG. 6B is a chart illustrating a method for uplink transmission in the system of FIG. 6A.

FIG. 6B is a chart illustrating a method for uplink transmission in the system 60 of FIG. 6A. Referring to FIG. 6B, a negotiation process similar to that illustrated by reference to FIG. 5B is performed in relation to the BS, $RS_1$ and $RS_2$. It is assumed that CID4 and CID6 have been assigned to the MS, and $RS_1$, $RS_2$ and MS have IDs RS01, RS02 and MS01, respectively. After the negotiation process, $RS_2$ and $RS_1$ recognize that they will relay the first PDU including a CID4 header and the second PDU including a CID6 header. The BS broadcasts an uplink map (UL-MAP) message, which indicates that a first time interval $T_1$, a second time interval $T_2$ and a third time interval $T_3$ are allocated to the MS, $RS_2$ and $RS_1$, respectively. Also referring to FIG. 6A, the MS sends and the $RS_2$ receives the first and second PDUs in response to the time interval $T_1$. The $RS_2$ then sends and the $RS_1$ receives the first and second PDUs in response to the time interval $T_2$. Subsequently, the $RS_1$ sends the first and second PDUs to the BS in response to the time interval $T_3$.

The frame format of the RLY-REQ message for the uplink transmission is given below, assuming that the $RS_1$, $RS_2$ and MS have IDs RS01, RS02 and MS01, respectively.

(1) the format sent from the BS to the $RS_1$:

| M1 | 3 | MS01 | 2 | (RS02, RS01); (MS01, RS02) | 2 | CID4, CID6 |
|---|---|---|---|---|---|---|

(2) the format sent from the RS1 to the RS2:

| M1 | 3 | MS01 | 1 | (MS01, RS02) | 2 | CID4, CID6 |
|---|---|---|---|---|---|---|

The frame format of the RLY-RSP message for the uplink transmission is given below.

(1) the format sent from the RS1 to the BS:

| M2 | 3 | MS01 |
|---|---|---|

(2) the format sent from the RS2 to the BS:

| M2 | 3 | MS01 |
|---|---|---|

The mapping tables for the uplink transmission are given below.

(1) the mapping table in the RS2:

| CID4 | MS01 | MS01 | RS02 |
|---|---|---|---|
| CID6 | MS01 | MS01 | RS02 |

(2) the mapping table in the $RS_1$:

| CID4 | MS01 | RS02 | RS01 |
|---|---|---|---|
| CID6 | MS01 | RS02 | RS01 |

It will be appreciated by those skilled in the art that changes could be made to one or more of the examples described above without departing from the broad inventive concept thereof. It is understood, therefore, that this invention is not limited to the particular examples disclosed, but it is intended to cover modifications within the scope of the present invention as defined by the appended claims.

Further, in describing certain illustrative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. An apparatus comprising:
    a base station configured to assign a first connection identifier to a relay station that is configured to relay data between the base station and a mobile station, the base station also being configured to assign a different, second connection identifier to the mobile station, wherein the first connection identifier and second connection identifier have a corresponding first time interval and second time interval, respectively,
    wherein the base station is configured to send a protocol data unit through the relay station to the mobile station, wherein the protocol data unit identifies the second connection identifier assigned to the mobile station, but does not identify the first connection identifier assigned to the relay station, and
    wherein the base station being configured to send a protocol data unit through the relay station to the mobile station includes being configured to send the protocol data unit to the relay station during the first time interval, the relay station being configured to forward the protocol data unit to the mobile station during the second time interval.

2. The apparatus of claim 1, wherein the base station is configured to manage a map identifying the first and second connection identifiers and the first and second time intervals corresponding thereto, the map informing the relay station of the second time interval during which to forward the protocol data unit to the mobile station.

3. The apparatus of claim 1, wherein the base station is configured to participate in a negotiation process with the relay station before sending a protocol data unit through the relay station to the mobile station, wherein the negotiation process informs the relay station of the second connection identifier of the mobile station, and a forthcoming a protocol data unit that identifies the second connection identifier assigned to the mobile station.

4. The apparatus of claim 3, wherein being configured to participate in a negotiation process includes being configured to:
    send a relay request message to the relay station; and in response thereto,
    receive a relay response message from the relay station,
    wherein at least one of the relay request message or relay response message identifies the second connection identifier of the mobile station, and includes a list that identifies connection identifiers of a pair of input and output stations, the input station comprising the relay station and the output station comprising the mobile station or another relay station between the relay station and the mobile station.

5. An apparatus comprising:
a mobile station configured to receive data communications directed to the mobile station, wherein a base station is configured to assign a first connection identifier to the mobile station and a second, different connection identifier to a relay station configured to relay data between the base station and the mobile station, wherein the mobile station and relay station have a corresponding first time interval and second time interval, respectively,
wherein the mobile station is configured to send a protocol data unit through the relay station to the base station, wherein the protocol data unit identifies the first connection identifier assigned to the mobile station, but does not identify the second connection identifier assigned to the relay station, and
wherein the mobile station being configured to send a protocol data unit through the relay station to the base station includes being configured to send the protocol data unit to the relay station during the first time interval, the relay station being configured to forward the protocol data unit to the base station during the second time interval.

6. The apparatus of claim 5, wherein the mobile station is configured to receive a map identifying the mobile station and relay station and the first and second time intervals corresponding thereto, the relay station also being configured to receive the map to inform the relay station of the second time interval during which to forward the protocol data unit to the base station.

7. An apparatus comprising:
a relay station configured to relay a protocol data unit between a base station and a mobile station, wherein on a downlink, the base station is configured to assign a first connection identifier to the relay station and a second, different connection identifier to the mobile station, and wherein the first connection identifier and second connection identifier have a corresponding first time interval and second time interval, respectively,
wherein the relay station being configured to relay a protocol data unit between a base station and a mobile station includes being configured to receive a protocol data unit from the base station during the first time interval, and forward the protocol data unit to the mobile station during the second time interval, wherein the protocol data unit identifies the second connection identifier assigned to the mobile station, but does not identify the first connection identifier assigned to the relay station.

8. The apparatus of claim 7, wherein the relay station is configured to receive a downlink map identifying the first and second connection identifiers and the first and second time intervals corresponding thereto, the downlink map informing the relay station of the second time interval during which to forward the protocol data unit to the mobile station.

9. The apparatus of claim 7, wherein on an uplink, the base station is further configured to assign a third connection identifier to the mobile station and a fourth, different connection identifier to the relay station, wherein the third connection identifier and fourth connection identifier have a corresponding third time interval and fourth time interval, respectively,
wherein the protocol data unit the relay station is configured to receive from the base station comprises a first protocol data unit, wherein the relay station is configured to receive a second protocol data unit from the mobile station during the third time interval, and forward the second protocol data unit to the base station during the fourth time interval, wherein the second protocol data unit identifies the third connection identifier assigned to the mobile station, but does not identify the fourth connection identifier assigned to the relay station.

10. The apparatus of claim 9, wherein the relay station is configured to receive an uplink map identifying the third and fourth connection identifiers and the third and fourth time intervals corresponding thereto, the uplink map informing the relay station of the fourth time interval during which to forward the protocol data unit to the base station.

11. The apparatus of claim 7, wherein the relay station is configured to participate in a negotiation process with the base station before relaying a protocol data unit between the base station and mobile station, wherein the negotiation process informs the relay station of the second connection identifier of the mobile station, and a forthcoming a protocol data unit that identifies the second connection identifier assigned to the mobile station.

12. The apparatus of claim 11, wherein being configured to participate in a negotiation process includes being configured to:
receive a relay request message from the base station; and in response thereto,
send a relay response message to the base station,
wherein at least one of the relay request message or relay response message identifies the second connection identifier of the mobile station, and includes a list that identifies connection identifiers of a pair of input and output stations, the input station comprising the relay station and the output station comprising the mobile station or another relay station between the relay station and the mobile station.

13. A method comprising at a base station:
assigning a first connection identifier to a relay station that is configured to relay data between the base station and a mobile station, and assigning a different, second connection identifier to the mobile station, wherein the first connection identifier and second connection identifier have a corresponding first time interval and second time interval, respectively; and
sending a protocol data unit through the relay station to the mobile station, wherein the protocol data unit identifies the second connection identifier assigned to the mobile station, but does not identify the first connection identifier assigned to the relay station,
wherein sending a protocol data unit through the relay station to the mobile station includes sending the protocol data unit to the relay station during the first time interval, the relay station being configured to forward the protocol data unit to the mobile station during the second time interval.

14. The method of claim 13 further comprising:
managing a map at the base station that identifies the first and second connection identifiers and the first and second time intervals corresponding thereto, the map informing the relay station of the second time interval during which to forward the protocol data unit to the mobile station.

15. The method of claim 13 further comprising at the base station:
participating in a negotiation process with the relay station before sending a protocol data unit through the relay station to the mobile station, wherein the negotiation process informs the relay station of the second connection identifier of the mobile station, and a forthcoming a protocol data unit that identifies the second connection identifier assigned to the mobile station.

16. The method of claim 15, wherein participating in a negotiation process includes:
sending a relay request message to the relay station; and in response thereto,
receiving a relay response message from the relay station, wherein at least one of the relay request message or relay response message identifies the second connection identifier of the mobile station, and includes a list that identifies connection identifiers of a pair of input and output stations, the input station comprising the relay station and the output station comprising the mobile station or another relay station between the relay station and the mobile station.

17. A method comprising at a mobile station:
receiving data communications directed to the mobile station, wherein a base station is configured to assign a first connection identifier to the mobile station and a second, different connection identifier to a relay station configured to relay data between the base station and the mobile station, wherein the mobile station and relay station have a corresponding first time interval and second time interval, respectively; and
sending a protocol data unit through the relay station to the base station, wherein the protocol data unit identifies the first connection identifier assigned to the mobile station, but does not identify the second connection identifier assigned to the relay station,
wherein sending a protocol data unit through the relay station to the base station includes sending the protocol data unit to the relay station during the first time interval, the relay station being configured to forward the protocol data unit to the base station during the second time interval.

18. The method of claim 17 further comprising at the mobile station:
receiving a map identifying the mobile station and relay station and the first and second time intervals corresponding thereto, the relay station also receiving the map to inform the relay station of the second time interval during which to forward the protocol data unit to the base station.

19. An method comprising at a relay station:
relaying a protocol data unit between a base station and a mobile station, wherein on a downlink, the base station is configured to assign a first connection identifier to the relay station and a second, different connection identifier to the mobile station, and wherein the first connection identifier and second connection identifier have a corresponding first time interval and second time interval, respectively,
wherein relaying a protocol data unit between a base station and a mobile station includes:
receiving a protocol data unit from the base station during the first time interval; and
forwarding the protocol data unit to the mobile station during the second time interval, wherein the protocol data unit identifies the second connection identifier assigned to the mobile station, but does not identify the first connection identifier assigned to the relay station.

20. The method of claim 19 further comprising at the relay station:
receiving a downlink map identifying the first and second connection identifiers and the first and second time intervals corresponding thereto, the downlink map informing the relay station of the second time interval during which to forward the protocol data unit to the mobile station.

21. The method of claim 19, wherein on an uplink, the base station is further configured to assign a third connection identifier to the mobile station and a fourth, different connection identifier to the relay station, wherein the third connection identifier and fourth connection identifier have a corresponding third time interval and fourth time interval, respectively, wherein the protocol data unit received from the base station comprises a first protocol data unit, and wherein the method further comprises at the relay station:
receiving a second protocol data unit from the mobile station during the third time interval; and
forwarding the second protocol data unit to the base station during the fourth time interval, wherein the second protocol data unit identifies the third connection identifier assigned to the mobile station, but does not identify the fourth connection identifier assigned to the relay station.

22. The method of claim 21 further comprising at the relay station:
receiving an uplink map identifying the third and fourth connection identifiers and the third and fourth time intervals corresponding thereto, the uplink map informing the relay station of the fourth time interval during which to forward the protocol data unit to the base station.

23. The method of claim 19 further comprising at the relay station:
participating in a negotiation process with the base station before relaying a protocol data unit between the base station and mobile station, wherein the negotiation process informs the relay station of the second connection identifier of the mobile station, and a forthcoming a protocol data unit that identifies the second connection identifier assigned to the mobile station.

24. The method of claim 23, wherein participating in a negotiation process includes:
receiving a relay request message from the base station; and in response thereto,
sending a relay response message to the base station,
wherein at least one of the relay request message or relay response message identifies the second connection identifier of the mobile station, and includes a list that identifies connection identifiers of a pair of input and output stations, the input station comprising the relay station and the output station comprising the mobile station or another relay station between the relay station and the mobile station.

* * * * *